US012479710B2

(12) United States Patent
Cutaio et al.

(10) Patent No.: US 12,479,710 B2
(45) Date of Patent: Nov. 25, 2025

(54) CAPPING HEAD FOR A CAPPING MACHINE, CAPPING METHOD AND CAP

(71) Applicant: PELLICONI & C. S.p.A., Ozzano dell'Emilia (IT)

(72) Inventors: Francesco Cutaio, Toscanella di Dozza (IT); Federico Morselli, Bologna (IT); Doriano Naldi, Ozzano Dell'Emilia (IT)

(73) Assignee: PELLICONI S.P.A., Ozzano Dell'Emilia (IT)

( * ) Notice: Subject to any disclaimer, the term of this patent is extended or adjusted under 35 U.S.C. 154(b) by 0 days.

(21) Appl. No.: 18/690,981

(22) PCT Filed: Sep. 27, 2022

(86) PCT No.: PCT/IB2022/059187
§ 371 (c)(1),
(2) Date: Mar. 11, 2024

(87) PCT Pub. No.: WO2023/052997
PCT Pub. Date: Apr. 6, 2023

(65) Prior Publication Data

US 2025/0145439 A1 May 8, 2025

(30) Foreign Application Priority Data

Sep. 30, 2021 (IT) ........................ 102021000025139

(51) Int. Cl.
*B67B 3/18* (2006.01)

(52) U.S. Cl.
CPC ...................................... *B67B 3/18* (2013.01)

(58) Field of Classification Search
CPC .. B67B 3/18; B67B 3/264; B67B 3/14; B67B 3/00; B67B 3/10; B67B 3/02; B67B 3/20;
(Continued)

(56) References Cited

U.S. PATENT DOCUMENTS 4,356,680 A * 11/1982 Guest ........................ B67B 3/18 53/422
2010/0018158 A1* 1/2010 Vesentini .............. B67B 3/2066 53/317

FOREIGN PATENT DOCUMENTS

CA 980307 A 12/1975
IT 202000001648 A1 7/2021

OTHER PUBLICATIONS

International Search Report dated Nov. 29, 2022 from counterpart PCT App No. PCT/IB2022/059187.

* cited by examiner

*Primary Examiner* — Veronica Martin
(74) *Attorney, Agent, or Firm* — SHUTTLEWORTH & INGERSOLL, PLC; Timothy J. Klima

(57) ABSTRACT

A capping head for a capping machine including: a locking unit having a connecting portion and a capsule-pressing locking portion, wherein the connecting portion can be reversibly translated relative to the capsule-pressing locking portion between proximal and distal positions; a capping unit for capping a containment body; a drive unit to reversibly move the capping unit between operating and rest configurations; a transmission, acting between the connecting portion and the drive unit, to determine a rotation of the drive unit during a movement of the connecting portion between the proximal and distal positions. The capping unit includes rolling elements which can be activated on the side wall of the capsule to shape it to match a threaded portion of the containment body and is rotationally integral with the drive unit to perform a capping of the containment body activating the rolling elements for deforming the side wall of the capsule.

16 Claims, 8 Drawing Sheets

(58) Field of Classification Search
CPC . B67B 3/2033; B67B 2201/12; B67B 3/2066; B67B 3/06; B67B 3/24
See application file for complete search history.

CAPPING HEAD FOR A CAPPING MACHINE, CAPPING METHOD AND CAP

This application is the National Phase of International Application PCT/IB2022/059187 filed Sep. 27, 2022 which designated the U.S.

This application claims priority to Italian Patent Application No. 102021000025139 filed Sep. 30, 2021, which application is incorporated by reference herein.

TECHNICAL FIELD

This invention relates to a capping head for a capping machine, a capping method and a cap.

The invention relates to the technical field of machines for capping containing bodies of various types, for example bottles, jars and the like.

BACKGROUND ART

There are currently a plurality of different capping systems on the market, each of which is configured to apply to a container a particular type of cap, for example crown caps, twist-off caps and the like.

In particular, the context of this invention is that of caps which, once applied to the container, are removed by unscrewing, typically called twist-off caps.

Unlike other types of caps, the twist-off caps do not require devices, such as bottle openers, for their removal from the respective containers, but solely a twisting action generated by the hands of a user.

The cap according to the invention may be used for closing containers designed to contain solid, liquid and/or semi-liquid products.

The cap according to the invention is particularly, but not exclusively, suitable for closing glass bottles.

Currently, in the context of twist-off caps, there are various types of caps designed to be removed by unscrewing, each with its own features which make it particularly suitable for closing a specific container having a predetermined product inside it.

Said caps are characterised by the dimensions of the metal capsule which form them, in particular in terms of the size of the longest face and the height of the side part or skirt, and the outside appearance of the capsule.

In the case of containers for food products, for example homogenized products or marmalade, particularly large metal capsules and with low side walls are particularly suitable, designed to create vacuum closures thanks to the application of heat, preferably in the form of steam.

In the case of containers of non-pressurised liquids designed to be contained in bottles, such as, for example, oil, capsules are particularly suitable which are narrower but with high walls designed to be removed or reapplied to the neck of the bottle by at least one 360° turn of the cap.

These caps are applied to the bottles using rotational capping heads equipped with external rollers configured to make contact with and model the side wall of the cap, thereby imparting on said side wall the typical thread, visible also on the outside, designed to couple with the thread present on the neck of the bottle.

Disadvantageously, the above-mentioned dimensions of the caps determine high costs for the raw material of the capsules which affect the efficiency of the production chain.

Moreover, both the above-mentioned capping methods are particularly laborious and slow, such as to represent a bottleneck for the entire plant in which they are used, thus degrading the performance.

In the case of containers of pressurised liquids designed to be contained in bottles, such as, for example, beer or carbonated drinks, crown capsules are particularly suitable, characterised by the presence of an almost homogeneous sequence of crests and grooves in the side wall relative to the central part.

The crown caps are applied to the respective container by the action of a capping die which is lowered from above, coaxially with the container, to deform the side wall and guarantee the closure seal.

The crown caps are characterised by a high level of reliability of the closure seal, but have problems regarding the ergonomics and safety during the unscrewing and screwing operations: the alternating peaks and grooves do not guarantee sufficient comfort for the user during operations for removing the cap and the presence of a sharp edge in the end part of the side wall exposes the user to the risk of cutting.

There is therefore a strongly felt need in the context of metal closures of having a twist-off cap with an effective but particularly ergonomic and safe seal for the user during the operations for removing and applying the cap.

Another strongly felt need in the metal closure sector is that of having a capping head and a particularly effective and fast capping method, in such a way as not to adversely affect the efficiency of the entire plant in which the capping head is installed and wherein the method is performed.

DISCLOSURE OF THE INVENTION

An aim of the invention is to provide a capping head which satisfies the above-mentioned need, guaranteeing in particular the possibility of capping a container in an effective, ergonomic and safe manner.

Another aim of the inventions invention is to provide a capping head which is particularly effective and fast during the capping operations.

Yet another aim of the invention is to provide a capping method which is able to apply a cap to a container in a fast and effective manner.

Said aims are fully achieved according to the invention as characterised in the appended claims.

BRIEF DESCRIPTION OF DRAWINGS

These and other features are more apparent from the following description of several embodiments of the invention, illustrated by way of non-limiting example in the accompanying drawings, in which.

DETAILED DESCRIPTION OF PREFERRED EMBODIMENTS OF THE INVENTION

Figure 1A:
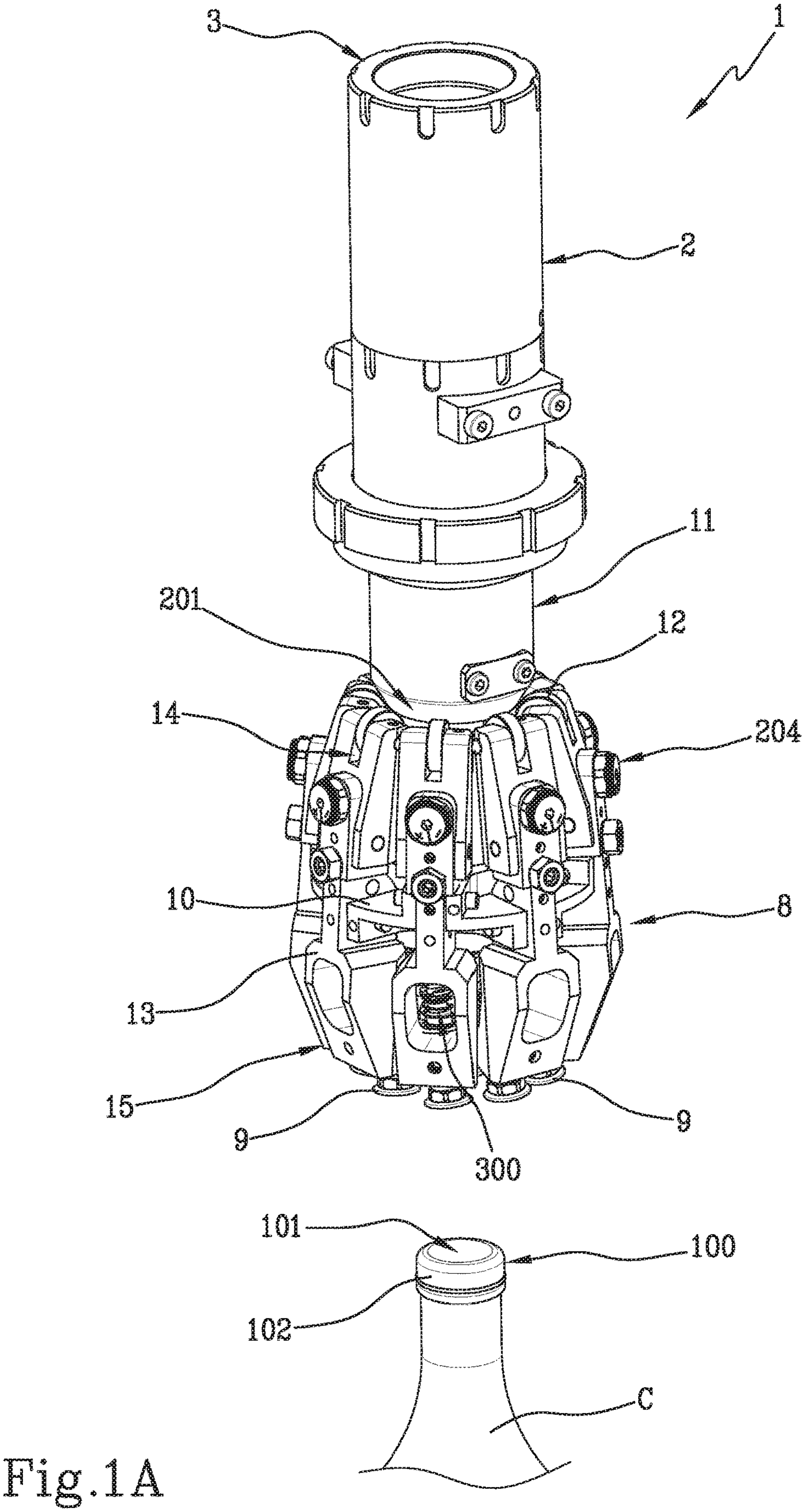
FIGS. 1A-1B are perspective views of respective operating conditions of a capping head for a capping machine according to a possible embodiment of the invention.
Figure 1B:
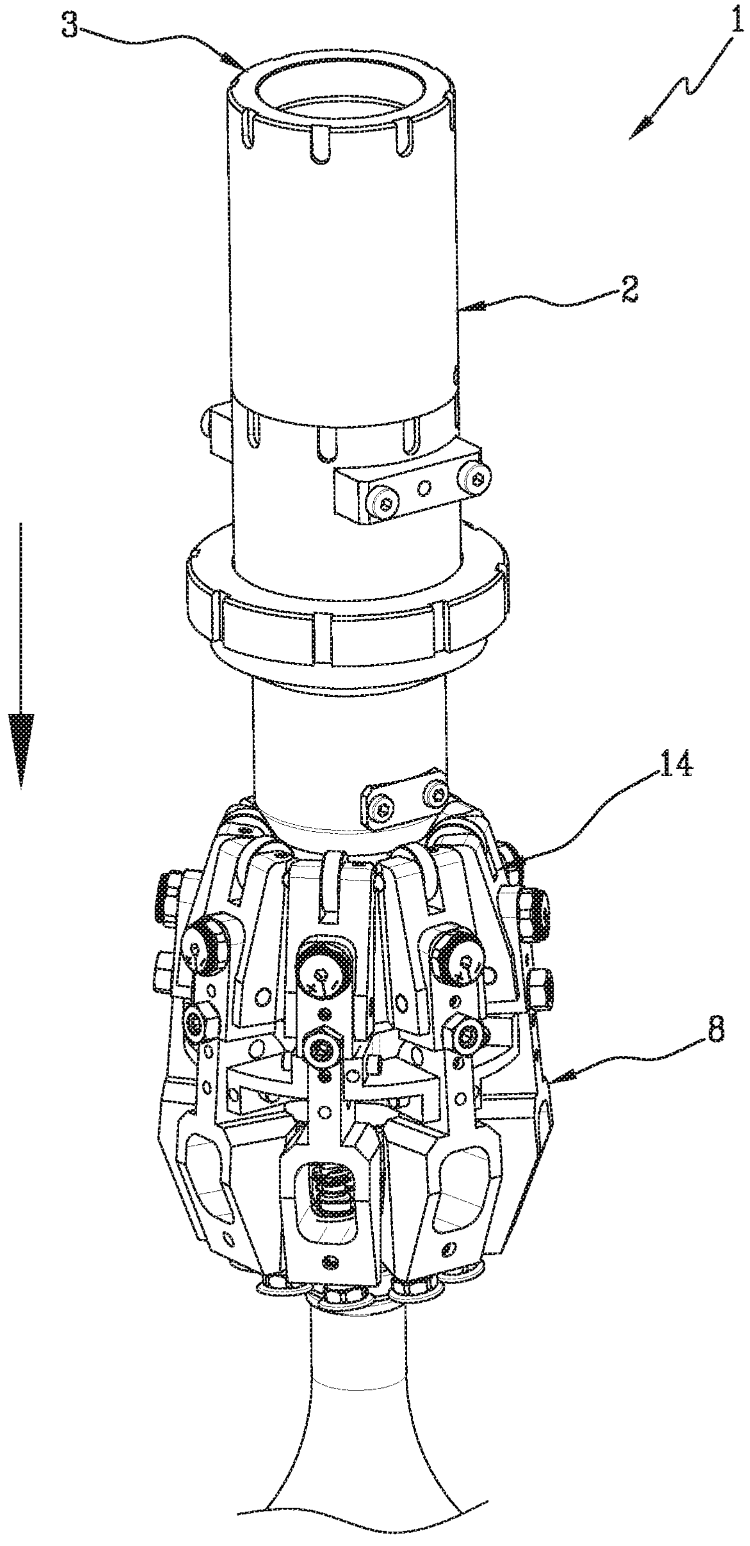
Figure 2A:
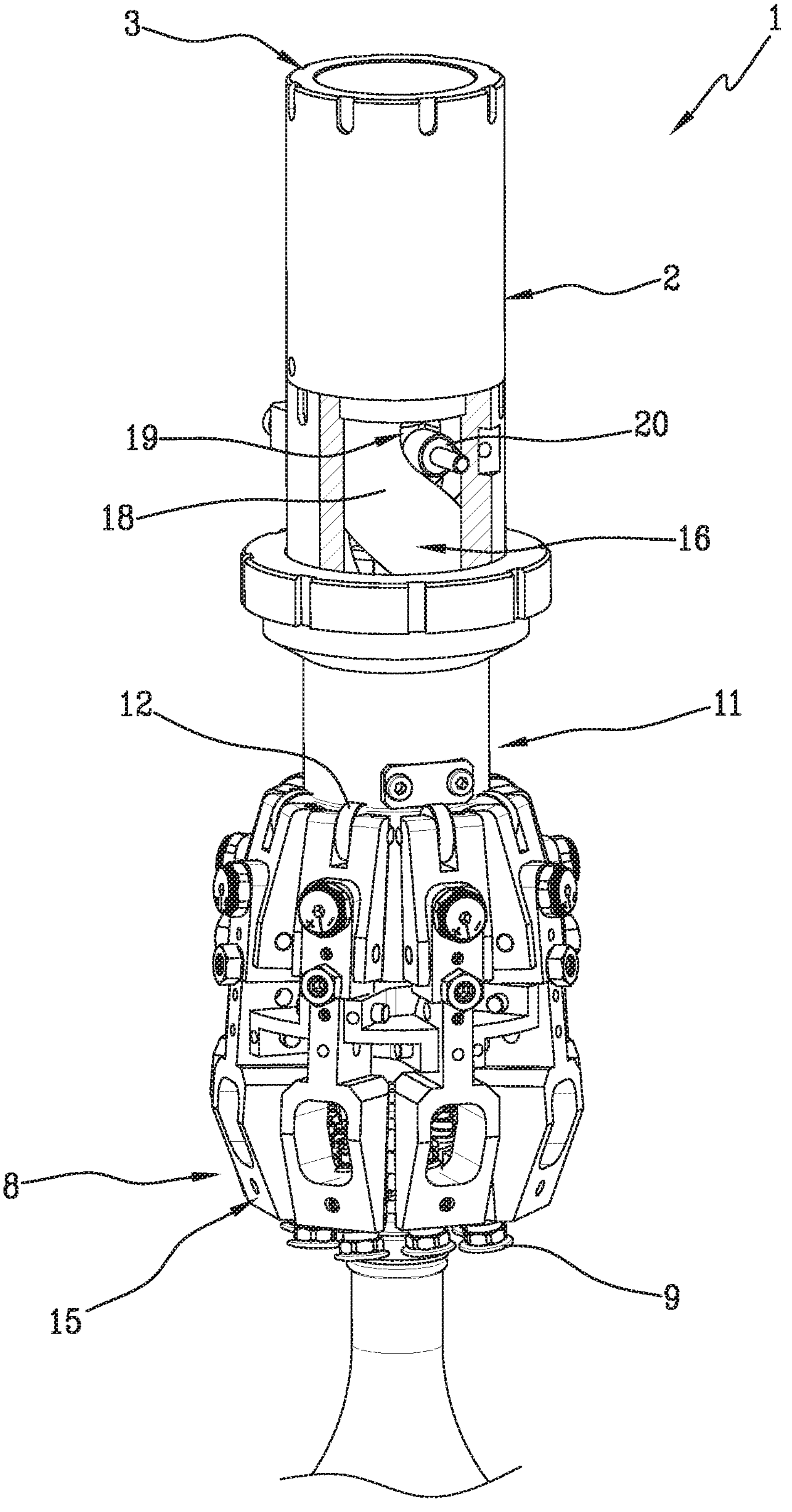
FIGS. 2A-2B are partial perspective cross sections of respective operating conditions of a capping head for a capping machine according to a possible embodiment of the invention.
Figure 2B:
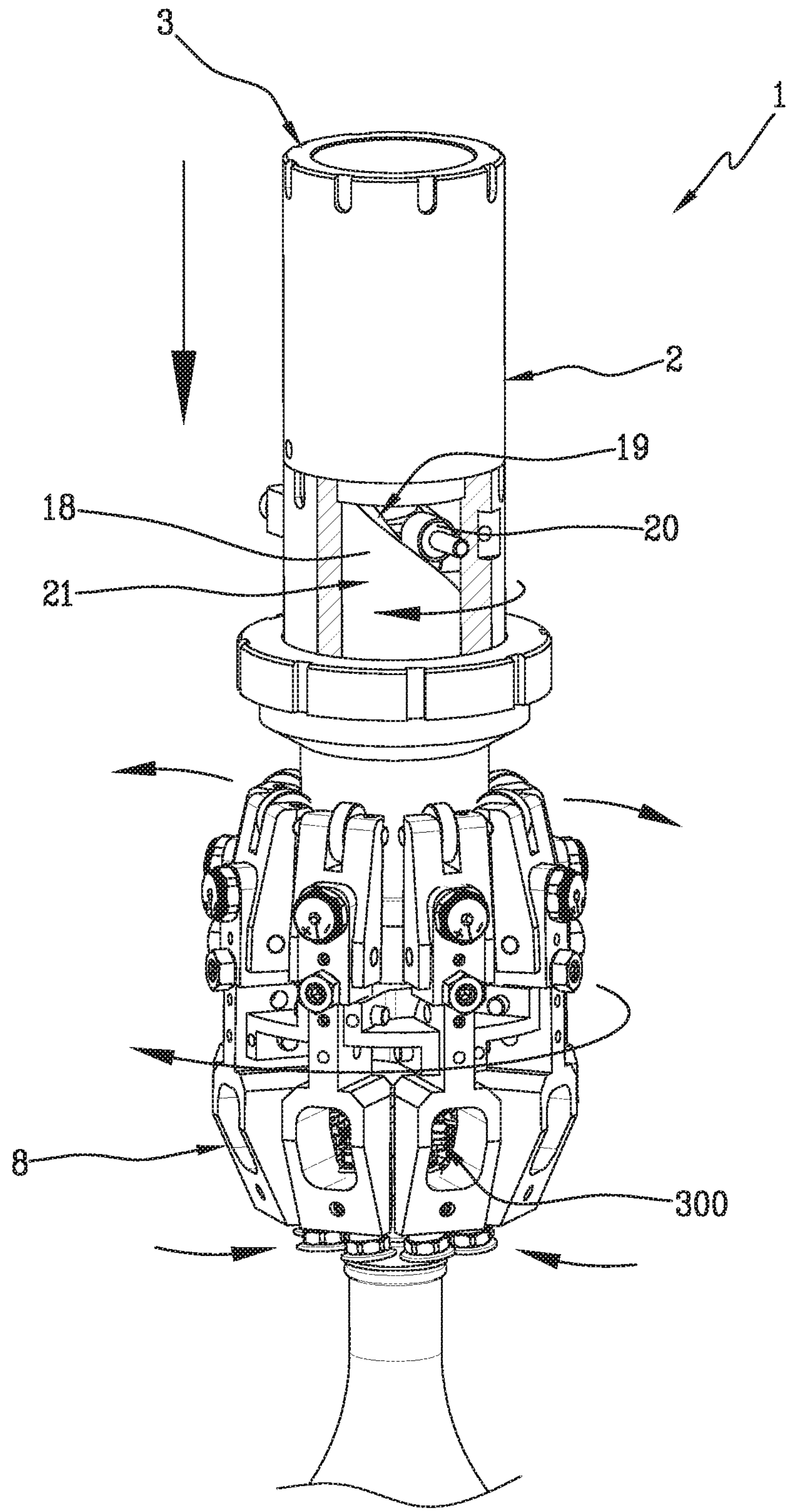
Figure 3A:
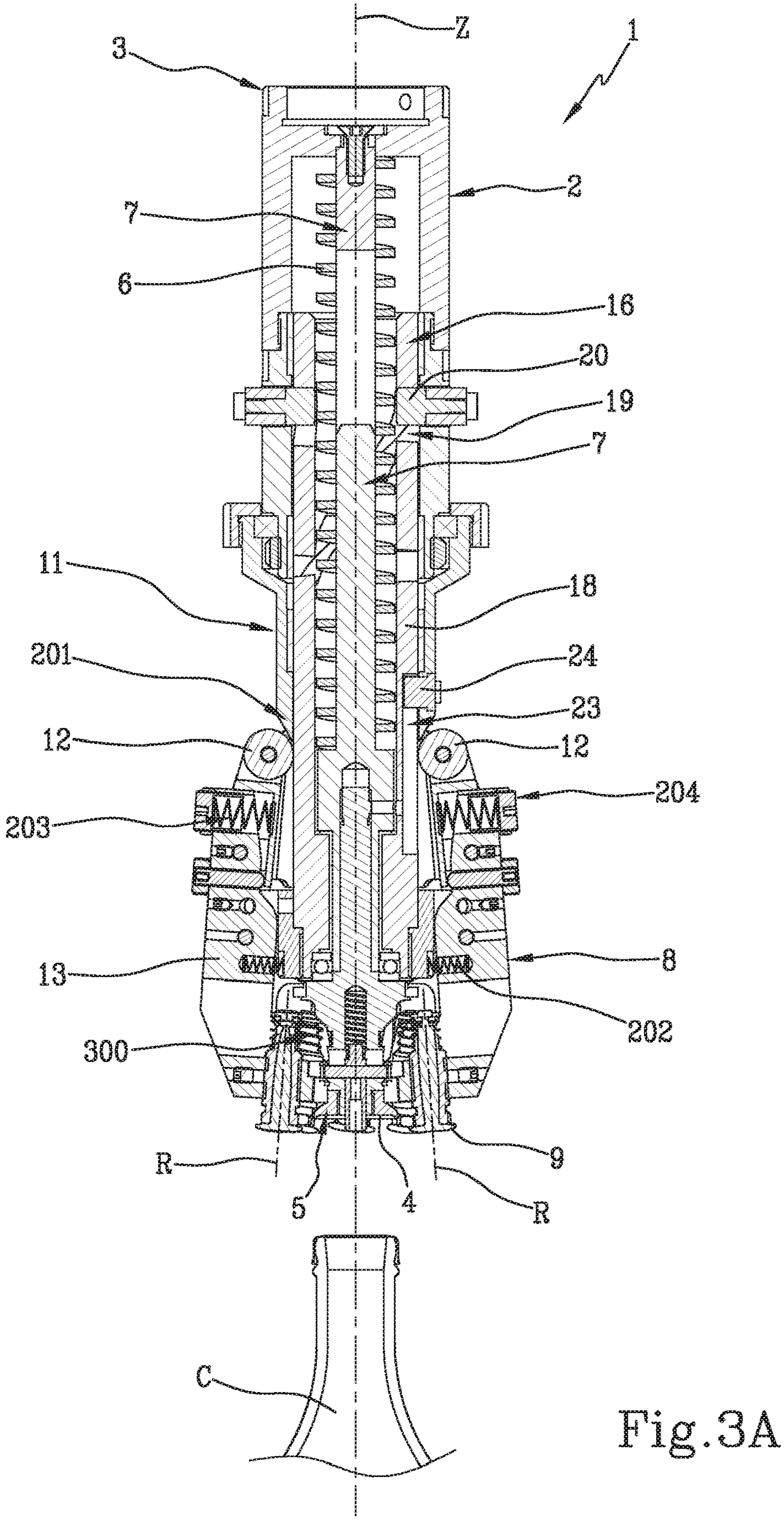
FIGS. 3A-3B are perspective cross sections of respective operating conditions of a capping head for a capping machine according to a possible embodiment of the invention.
Figure 3B:
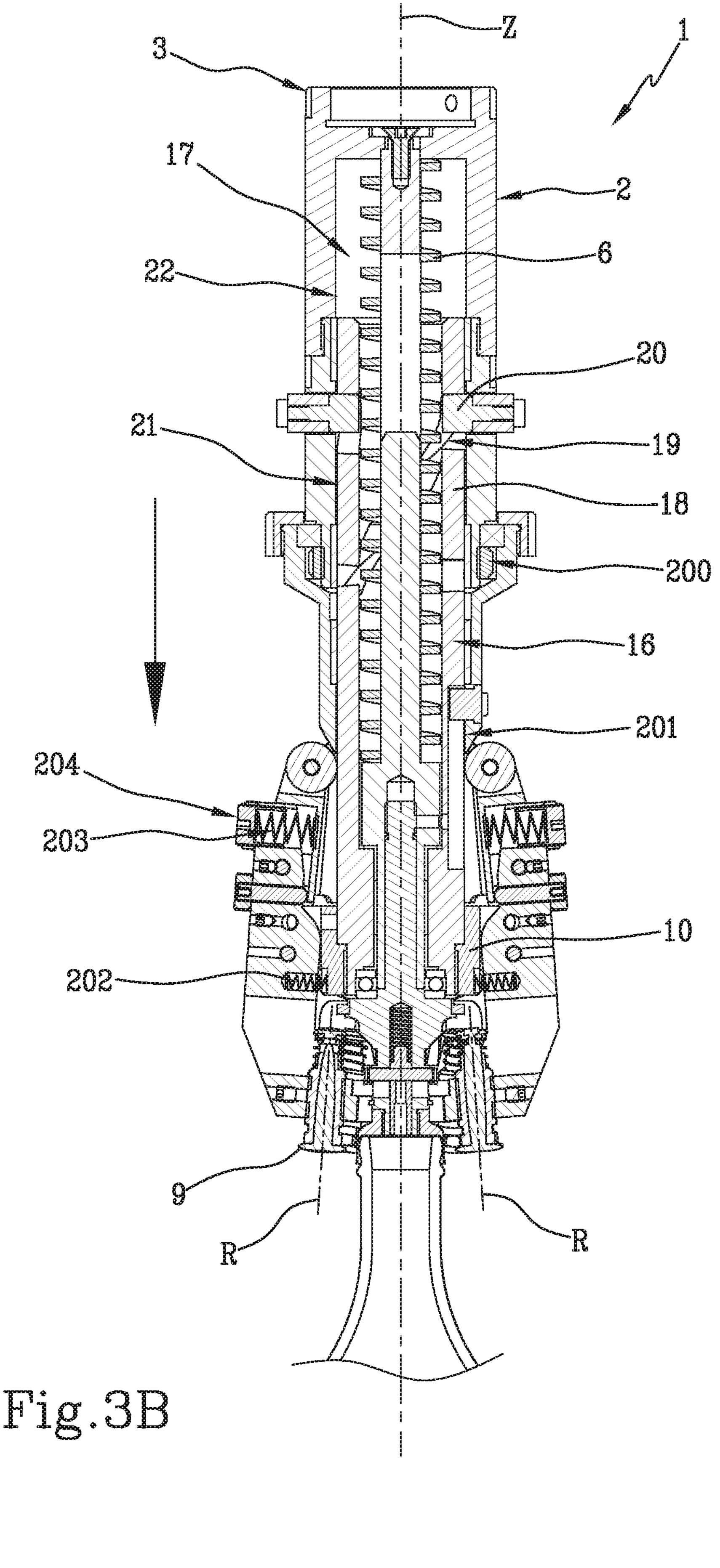
Figure 4A:
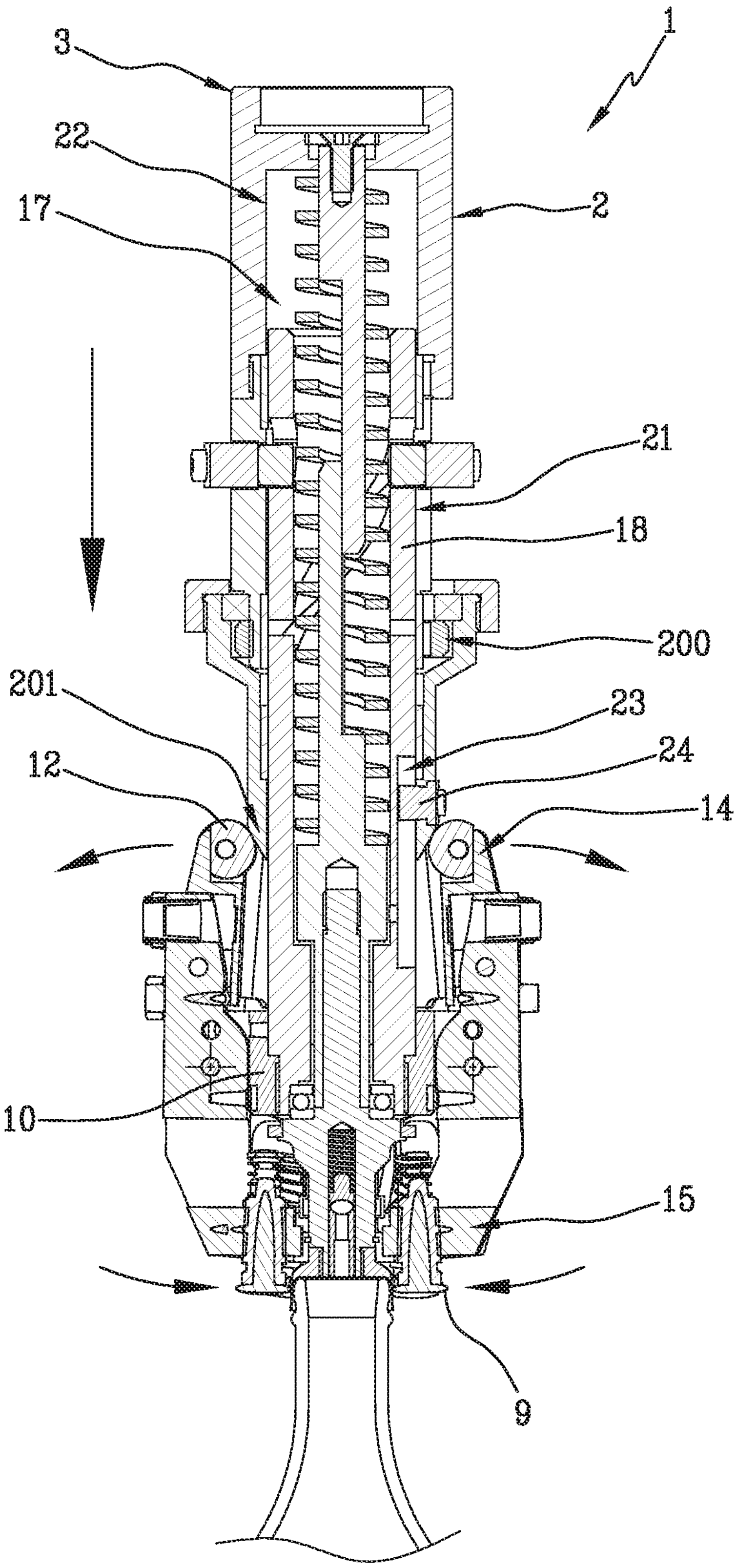
FIGS. 4A-4B are perspective cross sections of a further cross section plane of respective operating conditions of a capping head for a capping machine according to a possible embodiment of the invention.
Figure 4B:
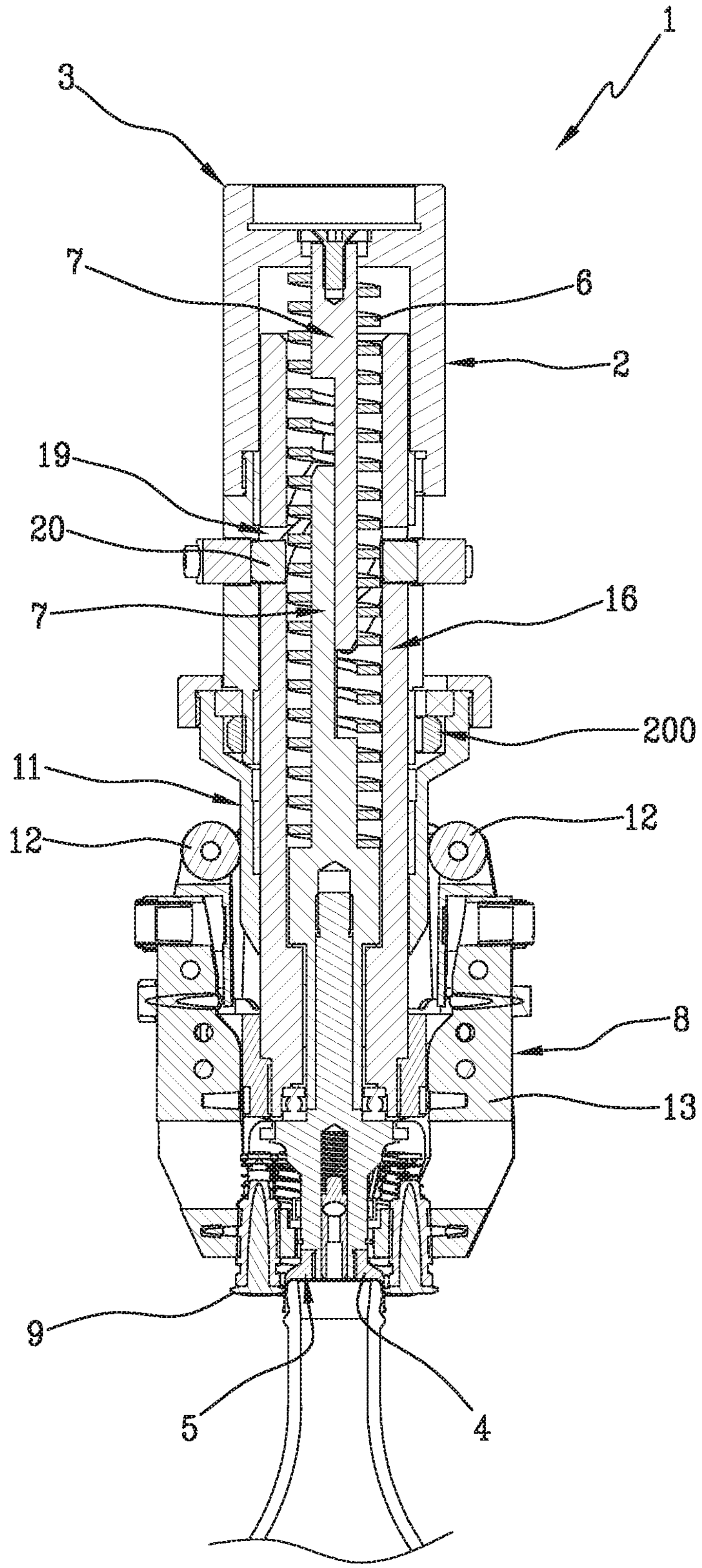

With reference to the accompanying drawings, the numeral 1 denotes a capping head for a capping machine which will hereinafter be referred to simply as capping head 1.

The capping head 1 comprises a locking unit 2 having a connecting portion 3, connected or connectable to a capping machine, and a locking portion 4 for pressing the capsule which can be activated on a wall (upper) of a capsule 100 for pressing the capsule 100 against a containment body C on which the capsule is applied during an operating condition of the capping head 1.

In particular, the connecting portion 3 can be reversibly translated relative to the locking portion 4 along a direction of translation "Z" between a proximal position and a distal position.

Advantageously, the locking unit 2 may comprise end of stroke means designed to limit and/or to define the path of the movement of the connecting portion 3 relative to the locking portion 4.

The end of stroke means may comprise, for example, opposite surfaces of the connecting portion 3 and of the locking portion 4 designed to abut when the connecting portion 3 is in the proximal position.

Preferably, the locking portion 4 comprises a pressing element 5 configured to be positioned in contact against an upper wall 101 of the capsule 100 in such a way as to block the rotation relative to the containment body "C" to be capped during an operating condition of the capping head 1.

In other words, during the above-mentioned operating condition the capsule 100 is interposed between the pressing element 5 and the containment body "C" and locked relative to them under the action of the force exerted by the pressing element 5 and the normal action applied by the containment body "C".

Preferably, the capping head 1 comprises a spring 6 housed inside the locking unit 2.

Advantageously, the spring 6 is configured to apply a predetermined force on the locking portion 4 to lock the capsule 100 during the above-mentioned operating condition of the capping head 1.

In particular, the spring 6 is active between the connecting portion 3 and the locking portion 4.

More specifically, the connecting portion 3 and the locking portion 4 can form respective contact walls designed to interface with respective ends of the spring 6.

Moreover, the spring 6 is reversibly configurable between a compressed configuration, corresponding to a proximal position of the connecting portion 3, and an extended configuration, corresponding to a distal position of the connecting portion 3.

In particular, in the compressed configuration, the spring 6 exerts a predetermined force on the locking portion 4 to lock the capsule 100.

According to a preferred, non-limiting embodiment of the invention, the above-mentioned force may be between 1,500 N and 3000 N, preferably between 2000 N and 2500 N, still more preferably between 2100 N and 2350 N.

Advantageously, the locking unit 2 may comprise a guide element 7 configured to support the spring 6 in such a way as to guarantee an effective movement, for example preventing any bulging and/or curving, during the movement between the above-mentioned compressed configuration and extended configuration.

In other words, the spring 6 may be at least partly fitted on the guide element 7.

In accordance with a preferred, non-limiting embodiment of the invention, the guide element 7 may have a tubular shape and be connected to the connecting portion 3 or to the locking portion 4 to support the spring 6 during the passage between the compressed configuration and the extended configuration.

According to a further possible embodiment of the invention, the guide element 7 may comprise a first portion connected to the connecting portion 3 and a second portion connected to the locking portion 4 and the spring 6 is fitted on both the above-mentioned first and second portions. In particular, the first and second portions may be subjected to a movement towards each other during the passage of the connecting portion 3 and of the locking portion 4 from the distal position to the proximal position and to a movement away from each other during the passage of the connecting portion 3 and the locking portion 4 from the proximal position to the distal position.

Advantageously, the first and second portions can define a shape coupling designed to prevent a mutual rotation of the connecting portion 3 and of the locking portion 4.

For example, the first and the second portion may have respective surfaces which can be facing at least during the proximal position of the connecting portion 3 in such a way as to form a geometrical interference at the reciprocal rotation.

The capping head 1 also comprises a capping unit 8 configured to perform a capping of the above-mentioned containment body "C".

In particular, the capping unit 8 can be reversibly moved between an operating configuration, wherein the capping unit 8 is active on the capsule 100 for capping the containment body "C", and a rest configuration, wherein the capping unit is not active on the capsule (100).

Preferably, the capping unit 8 comprises a plurality of rolling elements 9 which can be activated on a side wall 102 of the capsule 100 during the operating configuration of the capping unit 8 to shape it to match a threaded portion of the containment body "C".

Moreover, the capping unit 8 may comprise a supporting body 10 designed to support the above-mentioned rolling elements 9.

Preferably, the plurality of rolling elements 9 is reversibly movable radially between a minimum radial spacing position, corresponding to the operating configuration, and a maximum radial spacing position, corresponding to the rest position.

In other words, the rolling elements 9 can be radially moved between the position of minimum radial spacing, wherein the plurality of rolling elements 9 is at least partly active on the side wall 102 of the capsule 100, and the maximum radial spacing position, wherein the plurality of rolling elements 9 is at least partly not active on the side wall 102 of the capsule 100.

According to a possible embodiment of the invention and as illustrated in the accompanying drawings, the plurality of rolling elements 9 comprises eight equally spaced circumferentially rolling elements 9.

According to further possible embodiments of the invention not illustrated in the accompanying drawings, the plurality of rolling elements 9 may comprise a different number of rolling elements 9 and/or the rolling elements 9 may be positioned differently to that described above without altering the inventive concept which forms the basis of the invention.

Preferably, the above-mentioned rolling elements 9 are made in the form of forming rollers.

Advantageously, the rolling elements 9 can have an axis of rotation "R" inclined relative to the above-mentioned direction of translation "Z" in such a way as to allow an activation of the rolling elements 9 on the side wall 102 of the capsule 100 along a direction parallel, preferably substantially coinciding, with the extension of the threads of the above-mentioned threaded portion of the containment body "C".

In other words, the rolling elements 9 may be operatively connected to the threaded portion of the containment body "C" for plastically deforming the capsule 100.

Preferably, the plurality of rolling elements 9 may be sized in such a way as to comprise a number of rolling elements equal to twice the threads included in the threaded portion of the containment body "C".

Preferably, the axis of rotation "R" and the direction of translation "Z" define an angle of between 3° and 12°; preferably between 3° and 9°; still more preferably between 4° and 8°.

Still more preferably, said angle is between 5° and 7°.

Advantageously, the rolling elements 9 can be translated relative to the supporting unit 10 along the axis of rotation "R" in such a way that, after rolling, any interaction with the curling of the cap causes a substantial limit stop, preventing the rolling elements 9 from activating on inappropriate portions of the containment body.

In accordance with a possible embodiment of the invention and as illustrated in the accompanying drawings, the capping unit 8 may comprise shock absorbing means 300 acting on the rolling elements 9, preventing any impacts induced by the translation causing stresses which can result in a deformation or, possibly, an enucleation of cracks and/or the like on the supporting body 10 and/or on other portions of the capping head 1.

The capping head 1 also comprises a drive unit 11 of the capping unit 8 configured to reversibly move the capping unit 8 between the operating configuration and the rest configuration.

Preferably, the capping head 1 comprises a rolling coupling device 200 acting between the connecting portion 3 and the drive unit 11 designed to allow a relative rotation between the connecting portion 3 and the drive unit 11.

In other words, the drive unit 11 may be rotationally uncoupled from the connecting portion 3.

Moreover, the drive unit 11 is kinematically coupled to the connecting portion 3 for reversibly translating relative to the capping unit 8 between an active position, wherein the drive unit 11 is active on the capping unit to form the operating configuration of the capping unit 8, and an inactive position, wherein the drive unit 11 is not active on the capping unit 8 for forming the rest configuration of the capping unit 8.

Advantageously, the capping unit 8 is rotationally integral with the drive unit 11 for capping the containment body "C" activating the above-mentioned rolling elements 9 for deforming the side wall of the capsule 100 during the operating configuration.

Preferably, the capping unit 8 comprises at least one rotary cam 12 which can be operated by the drive unit 11 to promote a reversible movement of the capping unit 8 between the operating configuration and the rest position.

Still more preferably, the capping unit 8 may comprise a plurality of rotary cams 12 which can be operated by the drive unit 11.

In particular, the drive unit 11 may comprise at least one activation portion 201, preferably a plurality of activation portions, which can be activated on the rotary cam 12 for promoting the movement of the capping unit 8.

Advantageously, the activation portion 201 may have a substantially wedge-shaped shape for determining an effective activation of the rotary cam 12.

In accordance with a possible embodiment of the invention and as illustrated in the accompanying drawings, the capping unit 8 comprises a plurality of supporting elements 13 extending substantially parallel to the direction of translation "Z" between a first end 14, distal to the locking portion 4, and a second end 15, proximal to the locking portion 4, and each of the plurality of supporting elements 13 having a central body operably hinged to the supporting body 10 in a portion between the first end 14 and the second end 15.

Preferably, each supporting element 13 is associated with a rotary cam 12 and a rolling element 9 respectively positioned at the first end 14 and the second end 15 of the supporting element 13.

In accordance with a possible embodiment of the invention and as illustrated in the accompanying drawings, the capping unit 8 comprises elastic return means 202 acting on the supporting elements 13 to promote a passage of the rolling elements 9 from the minimum radial spacing position to the maximum radial spacing position.

Moreover, the capping unit 8 may comprise elastic preloading means 203 acting on the supporting elements 13 to determine the extent of the force applied to the side wall 102 of the capsule 100 by the rolling elements 9.

Advantageously, the capping unit 8 may comprise adjusting means 204 configured to adjust the force applied by the elastic preloading means 203 guaranteeing a high operational flexibility of the capping head 1.

In accordance with a purely non-limiting example embodiment of the invention, the adjusting means 204 can modify the limit stop of the elastic preloading means 203.

The capping head 1 also comprises transmission means 16 acting between the connecting portion 3 and the drive unit 11.

In particular, the transmission means 16 are configured to determine a rotation of the drive unit 11 in a first direction of rotation, during a movement of the connecting portion 3 between the proximal position and the distal position in a first direction of movement, and to determine a rotation of the drive unit 11 in a second direction of rotation, during a movement of the connecting portion 3 between the proximal position and the distal position in a second direction of movement opposite to the first direction of movement.

In particular, the drive unit 11 may be configured to maintain the operating configuration of the capping unit 8 at least during a portion of rotation in the first direction of rotation and at least during a portion of rotation in the second direction of rotation.

According to a possible embodiment of the invention and as illustrated in the accompanying drawings, the locking unit 2 defines a housing 17 designed to house at least partly the transmission means 16.

In particular, the transmission means 16 may comprise a rotary body 18 housed at least partly inside the locking unit 2.

More specifically, the rotary body 18 is designed to rotate relative to the connecting portion 3.

Moreover, the above-mentioned supporting body 10 is preferably rotationally coupled to the rotary body 18.

Preferably, the rotary body 18 has a tubular shape substantially shaped to match the housing 17.

Moreover, the transmission means 16 comprise at least one sliding guide 19 and at least one sliding pin 20 slidably inserted in the sliding guide 19.

In particular, the at least one sliding guide 19 is positioned at least partly on an outer side surface 21 of the rotary body 18 or on an inner side surface 22 of the connecting portion 3 and the at least one sliding pin 20 is at least partly projecting from the inner side surface 22 of the connecting portion 3 or from the outer side surface 21 of the rotary body 18.

Advantageously, the sliding guide 19 is at least partly helical, guaranteeing an effective conversion of the translating motion of the connecting portion 3 into rotational motion of the rotary body 18.

Very advantageously, the above-mentioned end of stroke means can define a translation path along the direction of translation "Z" which is more contained than that defined by the sliding guide 19 in such a way that in the proximal and distal positions of the connecting portion 3 the at least one sliding pin 20 does not make contact with or nor collide with the ends of the at least one sliding guide 19 preventing any impacts and/or stresses which may lead to a deformation or a possible enucleation of cracks and/or the like on the sliding pin 20 and/or on the sliding guide 19.

According to a preferred, non-limiting embodiment of the invention, the end of stroke means can define a translation path along the direction of translation "Z" of between 40 millimetres and 48 millimetres, preferably 46 millimetres, and the sliding guide 19 can define a translation path along the direction of translation "Z" of between 49 millimetres and 60 millimetres, preferably 51 millimetres.

According to further possible embodiments of the invention not illustrated in the accompanying drawings, the above-mentioned translation paths may have different dimensions without altering the inventive concept which forms the basis of the invention. According to a preferred embodiment, the sliding guide is defined by a substantially rectilinear groove.

According to a further embodiment not illustrated, the sliding guide 19 defines a helical profile.

In particular, the at least one sliding guide 19 and the at least one sliding pin 20 are operatively connected for determining a rotation of the rotary body 18 in the first direction of rotation during a movement of the connecting portion 3 between the proximal position and the distal position in the first direction of movement and for causing a rotation of the rotary body 18 in the second direction of rotation during a movement of the connecting portion 3 between the proximal position and the distal position in the second direction of movement.

Moreover, the transmission means may comprise at least one translation guide 23 substantially parallel to the direction of translation "Z" and at least one translation pin 24 slidably inserted in the translation guide 23.

In particular, the at least one translation guide 23 and the at least one translation pin 24 can be operatively connected to determine a translation of the drive unit 11 relative to the rotary body 18 during a movement of the connecting portion 3 between the proximal position and the distal position.

According to a possible embodiment of the invention and as illustrated in the accompanying drawings, the at least one translation guide 23 is positioned at least partly on an outer side surface 21 of the rotary body 18 and the at least one translation pin 24 is at least partly projecting from the inner side surface 22 of the connecting portion 3.

According to further possible embodiments of the invention not illustrated in the accompanying drawings, the at least one translation guide 23 may be positioned at least partly on an inner side surface 22 of the connecting portion 3 and the at least one translation pin 24 is at least partly projecting from the outer side surface 21 of the rotary body 18 without altering the inventive concept which forms the basis of the invention.

According to another aspect, the invention relates to a capping method for a containment body "C" comprising a step of preparing a containment body "C" having at least a threaded portion and a step of fitting a capsule 100 at the threaded portion in such a way that the upper wall 101 of the capsule 100 is substantially in contact on the containment body "C" and the side wall is substantially facing the above-mentioned threaded portion.

Moreover, the method comprises a step of applying a predetermined force along a direction substantially normal to the upper wall 101 of the capsule 100 for locking the capsule 100 relative to the containment body "C".

The method also comprises a step of applying a predetermined force by means of a plurality of rolling elements in a first direction of rotation to the side portion 102 of the capsule 100 for deforming it plastically in such a way as to shape the threaded portion to match the containment body "C".

Advantageously, the method comprises a step of applying a further predetermined force by means of the above-mentioned plurality of rolling elements in a second direction of rotation, opposite to the first direction of rotation, in such a way as to shape the capsule 100 to match the threaded portion.

It should be noted that, advantageously, the method allows a thread to be formed in the capsule 100, applying it in a sealed fashion to the containment body C, through the plurality of rolling elements, by applying a force rotating in a first and a second direction of rotation which are opposite to each other.

The plastic deformation of the capsule 100 therefore occurs in two steps: during the rotation in a first direction of rotation and in a second direction of rotation.

Preferably, the method comprises a step of preparing a capping head 1 as described above.

In particular, the method may comprise a step of connecting the capping head 1 to a capping machine and a step of positioning the above-mentioned pressing element 5 in contact with the upper wall 101 of the capsule 100.

Moreover, the method may comprise a step of moving the connecting portion 3 from the distal position to the proximal position in the first direction of movement along the direction of translation "Z" determining a rotation of the capping unit 8 and of the drive unit 11 in the first direction of rotation and a translation of the drive unit 11 relative to the capping unit 8 to determine a passage of the capping unit 8 from the rest configuration to the operating configuration.

Moreover, the method may comprise a step of moving the connecting portion 3 from the proximal position to the distal position in the second direction of movement along the direction of translation "Z" determining a rotation of the capping unit 8 and of the drive unit 11 in the second direction of rotation and a translation of the drive unit 11 relative to the capping unit 8 to determine a passage of the capping unit 8 from the operating configuration to the rest configuration.

In this way, the method makes it possible to reduce the capping time acting on the capsule 100 for an angularly limited stroke, for example between 90° and 180° (preferably between 95° and 160°, still more preferably between 100° and 130°), in both directions of rotation, determining an increase in the efficiency of the capping process compared with prior art systems.

In accordance with a further aspect, the invention relates to a cap for a container having a substantially flat upper portion and a side wall, projecting from the upper wall, having a substantially tubular shape.

In particular, the above-mentioned cap is made according to the method described above.

Advantageously, the cap may be made at least partly of metal, for example aluminium and/or steel.

According to a purely non-limiting example embodiment of the invention, the cap may be made of steel and having a thickness of between 0.09-0.22 mm, preferably between 0.12 and 0.2 mm, even more preferably between 0.13 and 0.18 mm. Preferably, said thickness is between 0.14 and 0.16 mm.

Advantageously, the cap may have a curling which facilitates the interface with a user during the steps of opening and/or closing the containment body "C".

Advantageously, the cap may be a cap of the twist-off type, guaranteeing a simplified opening and/or closing of the containment body "C" relative to the crown type of caps.

It should be noted, therefore, that the invention achieves the preset aims making a capping head and a capping method which is able to increase the speed and efficiency of the capping process compared with the prior art devices thanks to the presence of mechanical transmission means which allow the activation of the capping unit.

Advantageously, the invention overcomes the need for electro-mechanical actuators especially dedicated to generating a rotary motion of the capping unit, limiting the process costs and thus resulting in an improvement of the efficiency of the production process.

Advantageously, moreover, this invention makes it possible to reduce the capping time compared with prior art systems by acting on the capsule for an angularly limited stroke in both directions of rotation.

The invention claimed is:

1. A capping head for a capping machine comprising:

a locking unit having a connecting portion, the connecting portion having an engagement surface configured for engaging and connecting to a capping machine, and a capsule-pressing locking portion having a pressing surface configured to be positioned in contact against a respective wall of a capsule for pressing the capsule against a containment body on which the capsule is applied during an operating condition of said capping head;

wherein the connecting portion is reversibly translatable relative to said capsule-pressing locking portion along a direction of translation between a proximal position and a distal position;

a capping unit configured to perform a capping of the containment body;

wherein said capping unit is reversibly movable between an operating configuration, wherein said capping unit is active on the capsule for capping the containment body, and a rest configuration, wherein the capping unit is not active on the capsule;

a drive unit of the capping unit configured to reversibly move said capping unit between said operating configuration and said rest configuration;

wherein said drive unit is kinematically coupled to said connecting portion for reversibly translating relative to said capping unit between an active position, wherein said drive unit includes an activation surface which acts on said capping unit for forming said operating configuration of said capping unit, and an inactive position, wherein said drive unit is not active on said capping unit for forming said rest configuration of said capping unit;

a transmission mechanism, acting between the connecting portion and said drive unit, configured to determine a rotation of said drive unit in a first direction of rotation during a movement of said connecting portion between said proximal position and said distal position in a first direction of movement and to determine a rotation of said drive unit in a second direction of rotation during a movement of said connecting portion between said proximal position and said distal position in a second direction of movement opposite to said first direction of movement, wherein said transmission mechanism comprises at least one sliding guide defined by a groove and at least one sliding pin slidably inserted in said at least one sliding guide;

wherein said capping unit comprises a plurality of rolling elements having rolling outer surfaces configured to be activated on a side wall of the capsule during said operating configuration of said capping unit to shape the side wall to match a threaded portion of the containment body;

and wherein said capping unit is rotationally integral with said drive unit for capping the containment body activating said plurality of rolling elements for deforming the side wall of the capsule during said operating configuration.

2. The capping head according to claim 1, wherein said locking unit defines a housing configured to house at least partly said transmission mechansim; wherein said transmission mechanism comprises:

a rotary body housed at least partly inside said locking unit, said rotary body being configured to rotate relative to said connecting portion;

said at least one sliding guide being positioned at least partly on an outer side surface of said rotary body or on an inner side surface of said connecting portion and said at least one sliding pin being at least partly projecting from said inner side surface of said connecting portion or from said outer side surface of said rotary body;

wherein said at least one sliding guide and said at least one sliding pin are operatively connected for determining a rotation of said rotary body in the first direction of rotation during a movement of said connecting portion between said proximal position and said distal position in the first direction of movement and for causing a rotation of said rotary body in the second direction of rotation during a movement of said connecting portion between said proximal position and said distal position in the second direction of movement.

3. The capping head according to claim 2, wherein said transmission mechanism further comprises at least one translation guide substantially parallel to said direction of translation and at least one translation pin slidably inserted in said at least one translation guide; and wherein said at least one translation guide and said at least one translation pin are operatively connected to determine a translation of said drive unit relative to said rotary body during a movement of said connecting portion between said proximal position and said distal position.

4. The capping head according to claim 3, wherein said at least one translation guide is positioned at least partly on the outer side surface of said rotary body and said at least one translation pin at least partly projects from said inner side surface of said connecting portion.

5. The capping head according to claim 3, wherein said capping unit further comprises a supporting body configured to support said plurality of rolling elements; and wherein said supporting body is rotationally coupled to said rotary body.

6. The capping head according to claim 1, wherein said plurality of rolling elements are reversibly movable radially between a minimum radial spacing position, corresponding to said operating configuration, and a maximum radial spacing position, corresponding to said rest position.

7. The capping head according to claim 1, wherein said plurality of rolling elements comprise 8 equally circumferentially spaced rolling elements.

8. The capping head according to claim 1, wherein said plurality of rolling elements are forming rollers.

9. The capping head according to claim 1, wherein said plurality of rolling elements each have an axis of rotation which is inclined relative to said direction of translation, said axis of rotation and said direction of translation defining an angle of between 3° and 12°.

10. The capping head according to claim 1, wherein said capping unit comprises at least one rotary cam which is operable by said drive unit to promote a reversible movement of said capping unit between the operating configuration and said rest position.

11. The capping head according to claim 10, wherein said capping unit comprises a plurality of supporting elements, each of the plurality of supporting elements extending substantially parallel to said direction of translation between a first end, distal to said capsule-pressing locking portion, and a second end, proximal to said capsule-pressing locking portion, and each of the plurality of supporting elements having a central body operably hinged to said supporting body in a portion between said first end and said second end;
- wherein said capping unit comprises a plurality of rotary cams; and
- wherein each of the plurality of supporting elements has the central body operably connected to one of the rotary cams at said first end and to one of the plurality of rolling elements at said second end.

12. The capping head according to claim 1, wherein said drive unit is configured to maintain said operating configuration of said capping unit at least during a portion of rotation in said first direction of rotation and at least during a portion of rotation in said second direction of rotation.

13. The capping head according to claim 1, and further comprising a rolling coupling device active between said connecting portion and said drive unit and configured to allow a relative rotation between said connecting portion and said drive unit.

14. The capping head according to claim 1, and further comprising a spring housed inside said locking unit, said spring acting between said connecting portion and said capsule-pressing locking portion; wherein said spring is reversibly configurable between a compressed configuration, corresponding to the proximal position of said connecting portion, and an extended configuration, corresponding to the distal position of said connecting portion; and wherein said spring is configured to apply a predetermined force on said capsule-pressing locking portion for locking the capsule during said compressed configuration.

15. A capping method for a containment body, comprising the steps of:
- preparing the containment body having at least one threaded portion;
- fitting a capsule at the at least one threaded portion such that an upper wall of the capsule is substantially in contact with said containment body and a side wall of the capsule is substantially facing the at least one threaded portion;
- applying a predetermined force along a direction substantially normal to said upper wall for locking the capsule relative to said containment body;
- applying a predetermined force by a plurality of rolling elements having rolling outer surfaces engaging said side wall in a first direction of rotation to said side wall to deform the capsule plastically to shape the capsule to match said at least one threaded portion;
- applying a further predetermined force by said plurality of rolling elements in a second direction of rotation, opposite to said first direction of rotation to shape the capsule to match said at least one threaded portion.

16. The capping method according to claim 15, and further comprising a step of preparing a capping head.

* * * * *